June 25, 1957 G. S. MILES 2,797,385
ALTIMETER
Filed Sept. 15, 1952
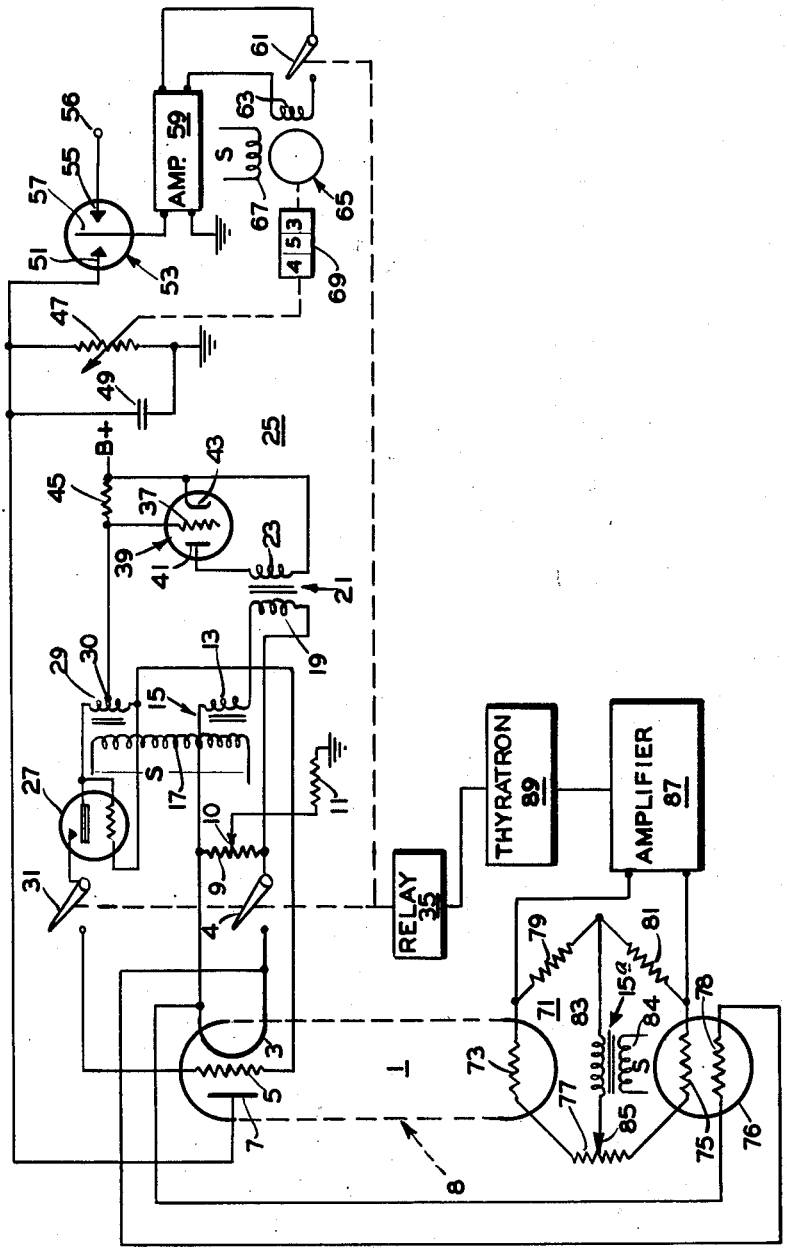
INVENTOR.
GEORGE S. MILES
BY
ATTORNEY United States Patent Office 2,797,385
Patented June 25, 1957

2,797,385
ALTIMETER

George S. Miles, Englewood, N. J., assignor to Bendix Aviation Corporation, Teterboro, N. J., a corporation of Delaware Application September 15, 1952, Serial No. 309,658

3 Claims. (Cl. 324—33)

The invention relates to altimeters and, more particularly, to altimeters for use at extremely high altitudes.

The present invention uses an ion gauge or ionization gauge for controlling an altitude indicator in response to changing pressure due to changes in altitude. While ion gauges have been used heretofore for measuring pressures in evacuated chambers and the like, ion gauges have not been incorporated in practical form in altimeters for measuring atmospheric pressure to indicate altitude. One difficulty encountered with the use of an ion gauge for indicating altitude is that below a predetermined altitude of approximately 250,000 feet the ion gauge filament, if energized, oxidizes rapidly and the life of the instrument is impaired. Also, erratic behavior of the ion tube at high pressures produces false readings of the indicator.

Another difficulty is that while the ion gauge is traversing the high pressure area the electrodes, particularly the grid, absorb gases and for accuracy the gases should be driven out of the grid before the ion gauge is used to indicate altitude.

Another difficulty is that the filament temperature must be maintained substantially constant to provide for uniform electron current in the gauge between the filament and grid. These deficiencies must be overcome for an altimeter using an ion gauge to be practical.

The main object of the present invention is to provide an altimeter which is practical and efficient for use at high altitudes and which uses an ion gauge responsive to atmospheric pressure for operating an altitude indicator.

Another object of the present invention is to provide an altimeter using an ion gauge wherein the ion gauge is deenergized automatically when the craft mounting the gauge flies below a predetermined altitude and the ion gauge is energized automatically when the craft flies above the predetermined altitude.

Another object of the invention is to provide means for automatically heating the grid for a predetermined time after energization of the ion gauge to drive occluded gases therefrom.

Another object is to provide for uniform electron current flow in the ion gauge by controlling filament temperature.

The invention contemplates an altimeter having means, such as an ion gauge, responsive to changes in pressure and adapted to provide signals corresponding thereto, means connected to the pressure responsive means for receiving the signals and providing potentials corresponding to the magnitude of the signals, a reference potential, means for detecting the difference between the signal responsive means and the reference potential, and means connected to the detecting means for balancing the potential of the signal receiving means and the reference potential. In the embodiment described in more detail hereinafter, the detecting means is in the form of a synchronous chopper including a vibrating reed engaging a pair of fixed contacts, one of the contacts being connected to the signal potential and the other contact being connected to the reference potential. When the fixed contacts of the synchronous chopper are at different potentials, it produces an A. C. signal which when amplified controls operation of a motor for balancing the potentials across the contacts and for driving an indicator to indicate altitude. Also, an altitude responsive device controls energization of the ion gauge filament at a predetermined altitude so that the filament is energized above the predetermined altitude and deenergized below the predetermined altitude. When the filament is energized, one of the electrodes of the ion gauge, preferably the grid, is heated for a predetermined interval to drive out occluded gases. The motor operating the indicator is also energized or deenergized upon energization or deenergization of the filament.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing shows a schematic wiring diagram of an altimeter constructed according to the invention.

Referring now to the drawing for a more detailed description of the novel altimeter of the present invention, the altimeter shown therein comprises an ion gauge 1 having a heated filament 3, a grid 5 and a plate or collector 7 enclosed in an envelope 8. Grid 5 is maintained at a substantial positive potential relative to filament 3 by a regulated power source B+ and collector 7 is maintained at a negative potential relative to filament 3 by a cathode bias resistor 11. With this arrangement, electron current flows from filament 3 to grid 5 and ionizes some of the gase molecules within the envelope to provide both negative and positive ions. The positive ions are attracted to the negatively charged collector 7 and provide ion current flow in the collector circuit.

Filament 3 is connected in series with armature contacts 4 of a relay 35 and in parallel with a center tapped resistor 9 having its center tap 10 connected through resistor 11 to ground. Parallel connected filament 3 and resistor 9 are connected in series with the secondary winding 13 of a transformer 15 having its primary winding 17 connected to an alternating power source S. Filament 3 and resistor 9 are also connected in series with the secondary winding 19 of a transformer 21 having its primary winding 23 connected in a filament temperature control circuit 25 responsive to flow of electron current through the ion gauge from filament 3 to grid 5.

Grid 5 is connected in series with armature contacts 31 of relay 35, a time delay relay 27, and a center tapped secondary winding 29 of transformer 15, to provide for energizing and heating the grid for a predetermined time after the ion tube is energized to drive occluded gases therefrom. Center tap 30 of secondary winding 29 of transformer 15 is connected to grid 37 of a triode 39 in the filament temperature control circuit 25. Triode 39 has a plate 41 and an indirectly heated cathode 43 connected to opposite ends of primary winding 23 of transformer 21. A grid biasing resistor 45 is connected between grid 37 and cathode 43 and to the B+ supply.

Control circuit 25 responds to changes in electron current flow in the ion gauge and adjusts the temperature of filament 3 so that ion current remains substantially constant. Tube 39 provides a variable shunt across primary winding 23 of transformer 21, as determined by the grid bias across resistor 45, and the impedance of secondary winding 19 in the filament circuit varies in accordance with current flow through the primary winding in control circuit 25.

A variable resistor 47 connected in parallel with a condenser 49 is connected at one side to ground and at the other side to collector 7 of ion gauge 1 and to a fixed contact 51 of a synchronous chopper 53. The other fixed contact 55 of synchronous chopper 53 is connected to a D. C. reference source 56 of fixed potential, preferbaly of about 20 millivolts. Vibrating reed 57 of the synchronous chopper is connected to the input of an amplifier 59 and the output of the amplifier is connected through relay armature contacts 61 of relay 35 to the variable phase winding 63 of a two phase reversible motor 65 having its fixed phase winding 67 energized by alternating power source S. Motor 65 is drivably connected to a counter 69 for indicating altitude and to variable resistor 47. When the voltage across variable resistor 47 is not the same as the reference voltage of source 56, the chopper produces an alternating current voltage whose phase depends upon which voltage is higher. The voltage of the chopper is amplified and energizes variable phase winding 63 of motor 65, whereupon motor 65 rotates in one direction or the other as determined by the phase of the voltage to actuate resistor 47 and counter 69 until the voltage across the resistor is the same as the reference voltage of source 56. When the voltage across resistor 47 is the same as the voltage of power source 56, variable phase winding 63 of motor 65 is deenergized and the motor remains at rest. When the system is balanced, the altitude is indicated on counter 69 and the altitude reading is a complex logarithmic function of resistance. Resistor 47 preferably is a modified logarithmic rheostat so that linear indications are provided on the indicator. In some instances it may be necessary to provide further logarithmic correction in the form of an adjustable cam and a non-linear mechanical coupling between the rheostat and indicator.

As explained above, if the filament 3 is energized when the craft is at relatively low altitudes, it will oxidize rapidly and impair the life of the instrument. For this reason, relay 35 has armature contacts 4 in the filament circuit of ion gauge 1 to deenergize the filament when the craft mounting the instrument is below a predetermined altitude. Also, relay 35 includes armature contacts 31 in the grid heating circuit for energizing the grid to heat the grid and drive out occluded gases. Relay 35 also has armature contacts 61 in the motor circuit to deenergize the motor.

Relay 35 is controlled by an altitude sensitive bridge circuit 71 having Pirani elements 73, 75, and a balancing resistor 77 in two of its legs and resistors 79, 81 in the other two of its legs. Pirani element 73 is positioned in envelope 8 of ion gauge 1 and Pirani element 75 is positioned within an envelope 76 enclosing a heater 78 connected in parallel with filament 3 and adapted to maintain Pirani element 75 at substantially the same temperature as Pirani element 73. A secondary winding 83 of a transformer 15a having its primary winding 84 connected to alternating current source S, is connected to the adjustable tap 85 of resistor 77 and between resistors 79, 81. The output of the bridge is applied to the input of an amplifier 87 which controls a thyratron 89 for operating relay 35. When the craft is above a predetermined altitude, the thyratron fires and closes armature contacts 4, 31 and 61 of relay 35 for energizing filament 3, for heating grid 5 for a predetermined time to drive off occluded gases, and for connecting the variable phase winding 63 of motor 65 to the output of amplifier 59. When the craft is below a predetermined altitude relay 35 is deenergized and contacts 4, 31 and 61 open so that the altimeter is rendered inoperative below the predetermined altitude.

The altimeter described herein and constructed according to the invention is practical and efficient for use at high altitudes. The ion gauge is deenergized automatically when the craft mounting the gauge flies below a predetermined altitude and the ion gauge filament is energized automatically when the craft flies above the predetermined altitude. Also, uniform electron current flow is provided in the ion gauge by controlling filament temperature. The grid is automatically heated for a predetermined time after energization of the ion gauge filament to drive out occluded gases from the grid. Also, the indicator motor is deenergized to avoid inaccurate altitude readings when the ion gauge is deenergized. Energization of the ion gauge is controlled by an altitude sensitive circuit described herein for controlling operation of a relay to energize the several elements of the system above the predetermined altitude and to deenergize the several elements of the system below the predetermined altitude.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In an altimeter, an ion gauge adapted to provide signals corresponding to altitude, a bridge circuit including a Pirani element in one of its legs and responsive to changes in altitude, switching means connected electrically to said ion gauge for controlling energization of said ion gauge and operably associated with said bridge circuit and controlled thereby, said bridge circuit operating said switching means at a predetermined altitude for energizing said ion gauge above said predetermined altitude and for deenergizing said ion gauge below said predetermined altitude.

2. In a device of the class described, an ion gauge adapted to provide signals in response to changes in pressure, said ion gauge having a plurality of electrodes, automatic means for heating at least one of said electrodes for a predetermined period after energization of said ion gauge to drive off occluded gases, said heating means including means for connecting said electrode to a potential source, and a time delay device in series with said electrode and the source for deenergizing said electrode after a predetermined period.

3. In a device of the class described, an ionization gauge having a heated filament, a grid at a positive potential relative to said filament, and a collector at a negative potential relative to said filament, means for automatically heating said grid a predetermined period after energization of said ion gauge to drive off occluded gases, said heating means including means for connecting said grid in series with a potential source, and a time delay device in series with said grid and the source for deenergizing said grid a predetermined period after energization of said ion gauge.

References Cited in the file of this patent

UNITED STATES PATENTS

| | | |
|---|---|---|
| 2,367,746 | Williams | Jan. 23, 1945 |
| 2,412,541 | Shivers | Dec. 10, 1946 |
| 2,595,611 | Simpson et al. | May 6, 1952 |
| 2,625,746 | Lander | Jan. 13, 1953 |

FOREIGN PATENTS

| | | |
|---|---|---|
| 486,156 | Great Britain | May 31, 1938 |
| 574,798 | Great Britain | Jan. 21, 1946 |
| 598,370 | Great Britain | Feb. 17, 1948 |

OTHER REFERENCES

Electronic Industries and Electronic Instrumentation August 1947, pages 6 and 7.

Journal of Scientific Instruments and Physics in Industry, May 1949, page 159, article by Milner.